United States Patent
Sugavanam et al.

(10) Patent No.: US 11,409,918 B1
(45) Date of Patent: Aug. 9, 2022

(54) ACCESS CONTROL MANAGEMENT OF BASEBOARD MANAGEMENT CONTROLLER PERIPHERALS

(71) Applicant: International Business Machines Corporation, Armonk, NY (US)

(72) Inventors: Krishnan Sugavanam, Mahopac, NY (US); Sandhya Koteshwara, White Plains, NY (US); Dong Chen, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/242,339

(22) Filed: Apr. 28, 2021

(51) Int. Cl.
  *G06F 21/85* (2013.01)
  *G06F 21/57* (2013.01)
  *G06F 21/64* (2013.01)

(52) U.S. Cl.
  CPC ............ *G06F 21/85* (2013.01); *G06F 21/572* (2013.01); *G06F 21/575* (2013.01); *G06F 21/64* (2013.01); *G06F 2221/2141* (2013.01)

(58) Field of Classification Search
  CPC ..... G06F 21/57–575; G06F 21/64–645; G06F 21/71; G06F 21/82–85; G06F 2221/2141
  See application file for complete search history.

(56) References Cited

U.S. PATENT DOCUMENTS

| | | | |
|---|---|---|---|
| 9,396,342 B2 | 7/2016 | Bakthavachalam et al. | |
| 10,289,423 B2 | 5/2019 | Nguyen et al. | |
| 10,762,244 B2 | 9/2020 | Fender et al. | |
| 2008/0201506 A1* | 8/2008 | Lee | G06F 13/4004 710/100 |
| 2013/0151841 A1 | 6/2013 | McGraw | |
| 2020/0320193 A1 | 10/2020 | Shivanna | |
| 2021/0334378 A1* | 10/2021 | Kennedy | H04L 9/3247 |

FOREIGN PATENT DOCUMENTS

| | | | | |
|---|---|---|---|---|
| EP | 2309735 A1 * | 4/2011 | | G11B 19/02 |
| WO | WO-2016207344 A1 * | 12/2016 | | G06F 21/6218 |

OTHER PUBLICATIONS

Intel, "Intel Server Systems Baseboard Management Controller (BMC) and BIOS Security", Intel Best Practices White Paper, Revision 1.2, Jan. 2021, 20 pages.
Zhuo et al., "Remote Management with the Baseboard Management Controller in Eighth-Generation Dell PowerEdge Servers", Oct. 2004, pp. 26-29.

(Continued)

*Primary Examiner* — Kevin Bechtel
(74) *Attorney, Agent, or Firm* — Stosch Sabo (57) ABSTRACT

Described is a baseboard management controller (BMC). The BMC comprises a BMC flash storage storing firmware and an access permission table. The access permission table defines an access control policy for access requests to peripherals communicatively coupled to the BMC. The BMC further comprises an access control chip comprising one or more processors and a write-once memory. The write-once memory stores a copy of the access permission table. The access control chip is configured to manage access to the peripherals using the access permission table.

20 Claims, 5 Drawing Sheets

(56) References Cited

OTHER PUBLICATIONS

Intel, "Intel System Configuration Utility—User Guide", Dec. 2012, 62 pages.
Anonymous, "Baseboard Management Controller non-disruptive reset", An IP.com Prior Art Database Technical Disclosure, IP.com No. IPCOM000230765D, IP.com Electronic Publication Date: Sep. 10, 2013, 3 pages.
Anonymous, "A System and Method of Data Processing Between Host OS and BMC Based on an Individual Storage Device", An IP.com Prior Art Database Technical Disclosure, IP.com No. IPCOM000228226D, IP.com Electronic Publication Date: Jun. 13, 2013, 8 pages.
Anonymous, "Communicate with BMC (Baseboard Management Controller) through Telephone Network", An IP.com Prior Art Database Technical Disclosure, IP.com No. IPCOM000220996D, IP.com Electronic Publication Date: Aug. 21, 2012, 4 pages.

* cited by examiner

| TARGET | REQUESTOR ID | ACCESS TYPE | ADDRESS RANGE | ACCESS PERMISSION |
|---|---|---|---|---|
| UEFI FLASH | BMC | RD | ENTIRE FLASH RANGE | ALLOWED |
| UEFI FLASH | BMC | WR | C-D | ALLOWED |
| UEFI FLASH | HOST | RD | ENTIRE FLASH RANGE | ALLOWED |
| UEFI FLASH | HOST | WR | ENTIRE FLASH RANGE | NOT ALLOWED |
| SENSOR 1 | BMC | RD | N/A | ALLOWED |
| SENSOR 1 | BMC | WR | N/A | ALLOWED |
| SENSOR 1 | HOST | RD | N/A | NOT ALLOWED |

ACCESS CONTROL MANAGEMENT OF BASEBOARD MANAGEMENT CONTROLLER PERIPHERALS

BACKGROUND

The present disclosure relates to access control management, and, more specifically, to access control management of hardware peripherals accessible to servers via baseboard management controllers (BMCs).

BMCs are specialized processors that monitor physical states of a computer, network server, or other hardware hosts. BMCs are sometimes considered part of the Intelligent Platform Management Interface (IPMI) sub-system. In some instances, BMCs are located in a motherboard or main circuit board of the device being monitored, while in other instances the BMCs are communicatively coupled to the device being monitored. BMCs can include sensors to measure variables such as temperature, humidity, power-supply voltage, fan speeds, communications, operating system (OS) functions, and the like. However, the peripherals connected to a BMC can present an attack vector for malicious exploitation. For example, a host (e.g., the device being monitored by the BMC) may be able to access the peripherals connected to the BMC through the host's connection to the BMC.

SUMMARY

Aspects of the present disclosure are directed toward a baseboard management controller (BMC). The BMC comprises a BMC flash storage storing firmware and an access permission table, where the access permission table defines an access control policy for access requests to peripherals communicatively coupled to the BMC. The BMC further comprises an access control chip comprising one or more processors and a write-once memory. The write-once memory stores a copy of the access permission table. Furthermore, the access control chip is configured to manage access to the peripherals using the access permission table.

Further aspects of the present disclosure are directed toward a system comprising a server and a baseboard management controller (BMC), where the BMC is communicatively coupled to the server. The BMC comprises a BMC flash storage storing firmware and an access permission table. The system further comprises a plurality of peripherals communicatively coupled to the BMC. The system further comprises an access control chip communicatively coupled to the BMC. The access control chip comprises one or more processors and a write-once memory, where the write-once memory is configured to store a copy of the access permission table. The access permission table defines an access control policy for access requests to the plurality of peripherals. Furthermore, the access control chip is configured to manage access to the plurality of peripherals using the access permission table.

Further aspects of the present disclosure are directed toward a computer-implemented method comprising storing an access permission table in a flash storage of a baseboard management controller (BMC), where the access permission table defines an access control policy for access requests to peripherals communicatively coupled to the BMC. The method further comprises performing a secure boot cycle of the BMC. The method further comprises copying the access permission table from the flash storage of the BMC to a write-once memory of an access control chip communicatively coupled to the BMC. The method further comprises detecting an access request for a peripheral communicatively coupled to the BMC. The method further comprises determining whether the access request is allowed based on the access permission table stored in the write-once memory.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward access control management, and, more specifically, to access control management of hardware peripherals accessible to servers via baseboard management controllers (BMCs). While not limited to such applications, embodiments of the present disclosure may be better understood in light of the aforementioned context.

Figure 1A:
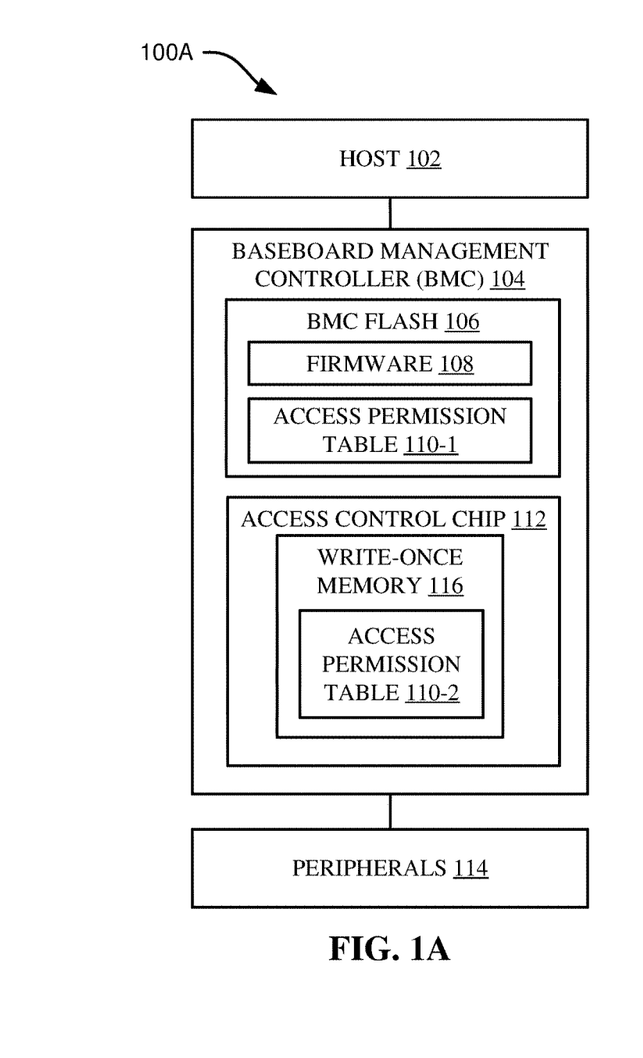
FIG. 1A illustrates a block diagram of a first example server environment where a write-once memory is incorporated into a BMC, in accordance with some embodiments of the present disclosure.

FIG. 1A illustrates a block diagram of a first example server environment 100A where a write-once memory 116 is incorporated into a BMC 104, in accordance with some embodiments of the present disclosure. The first example server environment 100A includes a host 102 communicatively coupled to a BMC 104. The host 102 can be any computational system such as a server, a computer, a desktop, a laptop, or any other computational system including one or more processors and one or more computer-readable storage media that can be associated with a BMC 104. In embodiments where the host 102 is a server, the server can be a component of a hybrid cloud environment, a public cloud environment, or a private cloud environment. In some embodiments, the host 102 is a single, tangible entity, whereas in other embodiments the host 102 is virtually provisioned from a plurality of tangible entities.

The BMC 104, in turn, is communicatively coupled to one or more peripherals 114. Peripherals 114 can include, but are not limited to, sensors (e.g., thermal sensors, humidity sensors, speed sensors, etc.), climate control devices (e.g., fans, etc.), flash memory devices, light emitting diodes (LEDs), communication links (e.g., Peripheral Component Interconnect (PCI) links, Ethernet links, etc.), and/or other peripherals.

The host 102 is communicatively coupled to the BMC 104 such as, for example, by Low Pin Count (LPC) busses, Inter-Integrated Circuit ($i^2C$) busses, or the like. As a result, the host 102 is indirectly connected to the peripherals 114 insofar as the host 102 is capable of routing requests to the peripherals 114 via the BMC 104. This indirect connection between the host 102 and the peripherals 114 presents numerous attack surfaces. For example, if the firmware that the host 102 executes is compromised, corrupted, or otherwise malicious, then the host 102 can gain access to one or more of the peripherals 114 that are controlled by the BMC 104.

Aspects of the present disclosure remedy the above issue by utilizing an access control chip 112. More specifically, aspects of the present disclosure store an access permission table 110-1 in a BMC flash 106 together with firmware 108. The access permission table 110-1 can define an access control policy for access requests to peripherals 114. The access permission table 110-1 can include specific permissions for specific types, targets, and/or sources of requests to peripherals 114. For example, the access permission table 110-1 can indicate if a request is allowed or not allowed based on a target, a requestor identifier (ID), an access type, an address range, and/or other factors. An example access permission table 110 (where access permission table 110 generally encompasses both access permission table 110-1 and access permission table 110-2 illustrated in FIGS. 1A and 1B) is shown with respect to FIG. 2.

When the BMC 104 undergoes a secure boot process, the firmware 108 verifies as unaltered the access permission table 110-1, and then the access permission table 110-1 is transferred, copied, or otherwise provided to a write-once memory 116 of an access control chip 112, where it is stored as access permission table 110-2. The access control chip 112 then enforces the access permission table 110-2 by monitoring traffic on busses associated with the peripherals 114 and determining whether specific requests are in violation of the access permission table 110-2. For requests not in violation of the access permission table 110-2, the access control chip 112 can allow the requests to proceed. For requests that are determined to be in violation of the access permission table 110-2, the access control chip 112 can take remedial action (e.g., issue a notification, a machine check exception (MCE), a machine check interrupt, a check stop, etc.).

The write-once memory 116 is a memory that is only writable once per boot cycle of the BMC 104. The write-once memory 116 can be, for example, a Write Once Read Many (WORM) storage device, or any other storage device that is physically limited to, or digitally limited to, being writable once per boot cycle of the BMC 104.

The access control chip 112 can be any computational system or subsystem capable of storing program instructions for moderating access to peripherals 114 using the permissions defined in the access permission table 110-2 in one or more computer-readable storage media, and implementing the program instructions by one or more processors. The access control chip 112 can be a specialized processor distinctly purposed for implementing access control using the access permission table 110-2, but it need not be. For example, the access control chip 112 can be any preexisting processing resources existing within BMC 104 that can be utilized to implement access control using the access permission table 110-2.

Aspects of the present disclosure present numerous advantages. Most generally, aspects of the present disclosure improve security by reducing the ability of a compromised host 102 to monitor, modify, or otherwise maliciously access peripherals 114 that are communicatively coupled to a BMC 104.

More specifically, the access permission table 110-1 is originally stored in the BMC flash 106 before being transferred to the access control chip 112. Advantageously, originally storing the access permission table 110-1 in the BMC flash 106 further improves the security posture of the BMC 104. For one, the access permission table 110-1 can be updated as needed using a similar mechanism as is used to install firmware updates to firmware 108. Insofar as firmware 108 can be updated securely, updates to access permission table 110-1 can be similarly secure. Furthermore, the access permission table 110-1 can be verified during BMC 104 bootup by the firmware 108. In other words, the boot-cycle can ensure that the access permission table 110-1 is not corrupted and thereby ensure the integrity of the access permission table 110-1 (e.g., by using encrypted signatures). Further, storing the access permission table 110-1 in the BMC flash 106 can make aspects of the present disclosure agnostic as to the type of BMC 104 incorporating aspects of the present disclosure insofar as each type of BMC 104 is enabled to verify and/or transfer the access permission table 110-1 to the write-once memory 116 using the procedures, protocols, and/or specifications relevant for each type of BMC 104. Yet another advantage to storing the access permission table 110-1 in the BMC flash 106 involves ease of migration of user jobs from one BMC 104 to another BMC insofar as the destination BMC 104 can be properly configured to implement its access permission table 110-1 based on the type of the destination BMC, how the destination BMC implements access controls, and so on.

Another advantage relates to the write-once memory 116. By transferring the access permission table 110-1 from the BMC flash 106 to the write-once memory 116 during bootup, the access permission table 110-1 can be securely implemented by a separate hardware component (e.g., access control chip 112) as will be discussed in more detail below. Because the write-once memory 116 is writable only once per boot cycle, it cannot be maliciously altered, corrupted, or otherwise compromised after the access permission table 110-2 is stored in the write-once memory 116. Thus, utilizing the write-once memory 116 provides additional security.

Figure 1B:
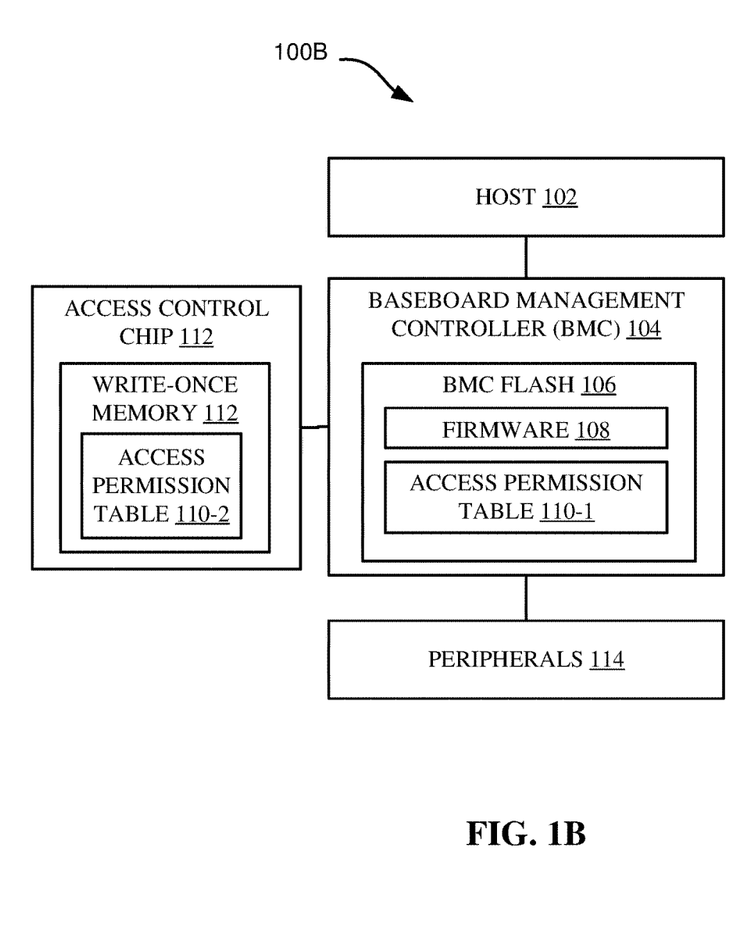
FIG. 1B illustrates a block diagram of a second example server environment where a write-once memory is communicatively coupled to a BMC, in accordance with some embodiments of the present disclosure.

FIG. 1B illustrates a block diagram of a second example server environment 100B where a write-once memory 116 is communicatively coupled to a BMC 104, in accordance with some embodiments of the present disclosure. As shown in FIG. 1B, the access control chip 112 resides outside of the BMC 104. This is different from FIG. 1A where the access control chip 112 is a component of the BMC 104. Each of FIGS. 1A and 1B have advantages. For example, when the access control chip 112 resides in the BMC 104 (as in FIG. 1A), the configuration may be simpler insofar as the BMC 104 already has access to the peripheral busses connecting peripherals 114 to BMC 104. In other words, when the access control chip 112 is incorporated into the BMC 104, the access control chip 112 can be more easily configured to perform its functions.

In contrast, embodiments where the access control chip 112 is separate from, and communicatively coupled to, the BMC 104, can enable the access control chip 112 to be retrofitted to an existing BMC 104. Even without the need to retrofit, the access control chip 112 can be electively separated from the BMC 104 for purposes of design modularity where a hardware engineers may prefer to keep the access control chip 112 distinct from the BMC 104 for maintenance, reliability, cost, and/or other considerations.

As will be appreciated by one skilled in the art, the configurations illustrated in FIGS. 1A and 1B are for illustrative purposes and not necessarily limiting. More or fewer components than the components shown can be incorporated into aspects of FIGS. 1A and 1B. Further, components can be placed in different configurations than the configurations shown in FIGS. 1A and 1B. Further still, some components can be more broadly or specifically characterized than as shown n FIGS. 1A and 1B. For example, BMC flash 106 may be any storage device associated with BMC 104 such as, for example, a BMC nonvolatile storage.

Figure 2:
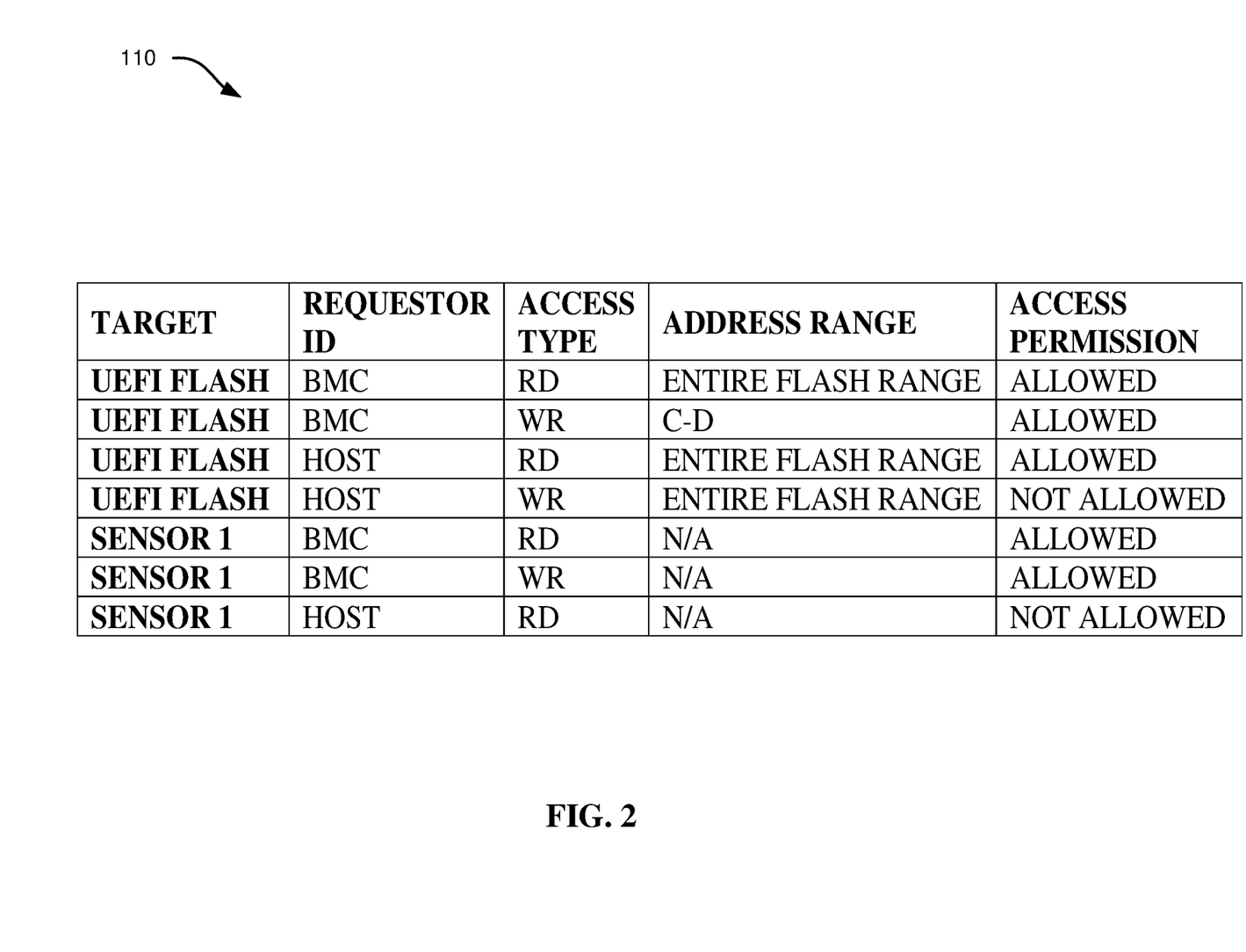
FIG. 2 illustrates an example access permission table, in accordance with some embodiments of the present disclosure.

FIG. 2 illustrates an example access permission table 110, in accordance with some embodiments of the present disclosure. Access permission table 110 can include a target, a requestor ID, an access type, an address range, and an access permission (e.g., allowed or not allowed) for numerous types of accesses to peripherals 114. For example, a target can be any one of the peripherals 114, such as a Unified Extensible Firmware Interface (UEFI) flash or a sensor. Requestor IDs can be the BMC 104, the host 102, or another requestor. The access type can be read (RD), write (WR), or another access type. The address range can be dependent on the target. For example, for a UEFI flash, the address range can be the entire flash range or a limited subset of the entire flash range (e.g., C-D). Alternatively, the address range may be null, not applicable (N/A), or otherwise undefined for peripherals 114 such as sensors. The access permission can be a binary allowed (e.g., 1), or not allowed (e.g., 0).

Although seven combinations of access requests are shown, the access permissions table 110 can include more (e.g., hundreds, thousands, etc.) or fewer access requests in other embodiments. Furthermore, although five columns are shown in the access permissions table 110 of FIG. 2, more or fewer columns can be used in other embodiments.

Figure 3:
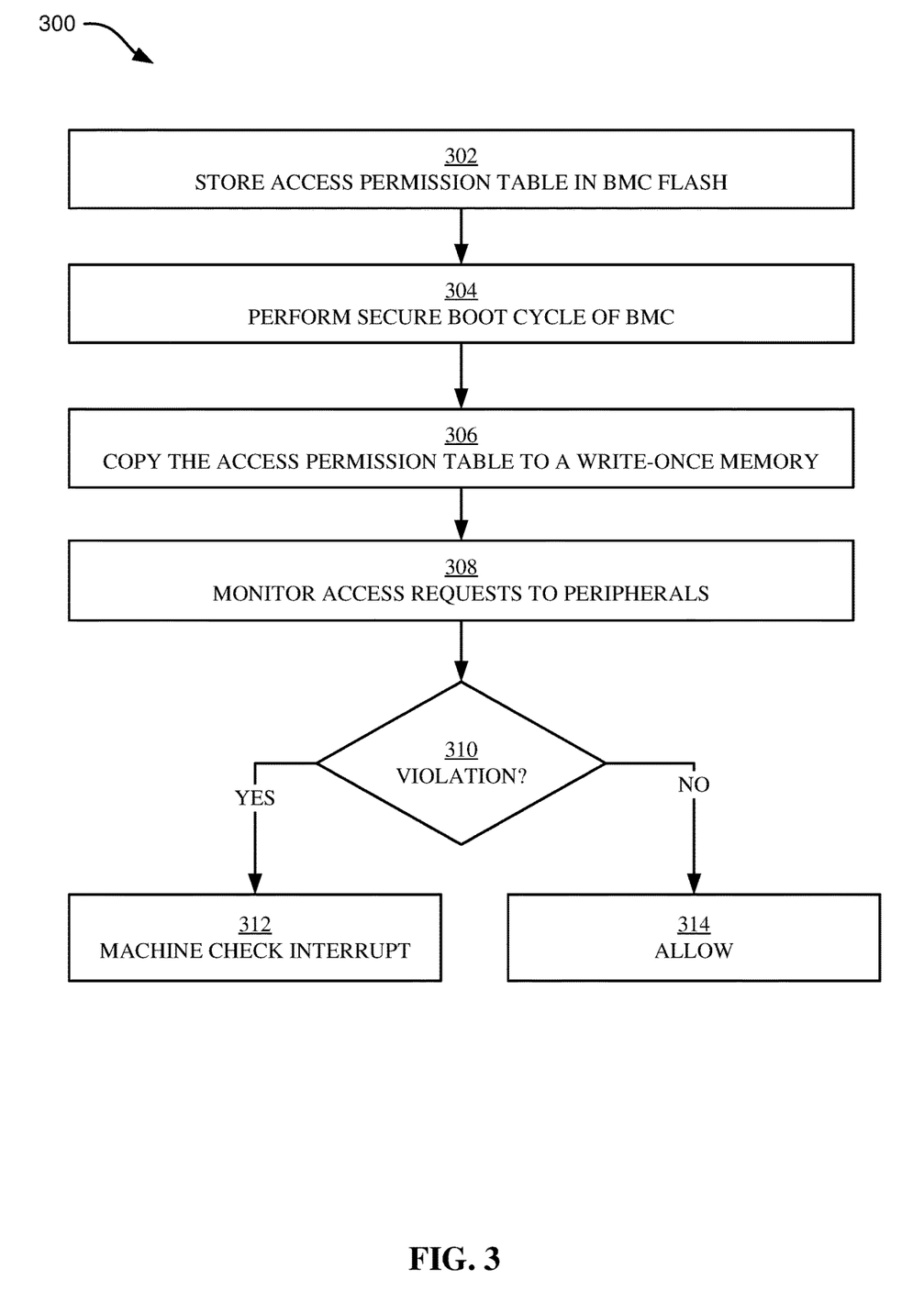
FIG. 3 illustrates a flowchart of an example method for implementing access control management for BMC-related peripherals, in accordance with some embodiments of the present disclosure.

FIG. 3 illustrates a flowchart of an example method 300 for implementing access control management for BMC-related peripherals, in accordance with some embodiments of the present disclosure. The method 300 can be implemented by a computer, a processor, one or more components illustrated in FIGS. 1A and/or 1B such as, but not limited to, the BMC 104, the access control chip 112, and/or another component or set of components.

Operation 302 includes storing an access permission table 110-1 in a BMC flash 106. In some embodiments, the access permission table 110-1 is stored in the BMC flash 106 as part of a firmware load or firmware update to firmware 108, which is also stored in the BMC flash 106.

Operation 304 includes performing a secure boot cycle of the BMC 104. In some embodiments, the secure boot cycle boots the BMC 104 using the firmware 108 stored in the BMC flash 106. In some embodiments, as part of the boot cycle, the BMC 104 verifies, validates, or otherwise checks the integrity of access permission table 110-1. Checking the integrity of the access permission table 110-1 can include, for example, comparing an original encrypted signature of the access permission table 110-1 to a current encrypted signature of the access permission table 110-1.

Operation 306 includes copying the access permission table 110-1 to a write-once memory 116. In some embodiments, the write-once memory 116 is stored by an access control chip 112 that is integrated into the BMC 104 (e.g., see FIG. 1A) or communicatively coupled to the BMC 104 (e.g., see FIG. 1B). Advantageously, the access permission table 110-2 stored in the write-once memory 116 cannot be maliciously or accidentally modified insofar as the write-once memory 116 can only be written to once per boot cycle of the BMC 104.

Operation 308 includes monitoring access requests to peripherals 114 associated with the BMC 104. Access requests can be monitored by monitoring busses connecting BMC 104 to peripherals 114, for example.

Operation 310 include determining if each of the access requests is or is not in violation of the access control policy based on the access permissions table 110-2. If the access request is not in violation of the access control policy based on the access permissions table 110-2 (310: NO), then the method 300 proceeds to operation 314 and allows the access request to proceed. Alternatively, if the access request is in violation of the access control policy based on the access permissions table 110-2 (310: YES), then the method 300 proceeds to operation 312 and issues a machine check exception (MCE), a machine check interrupt, a check stop, or another indicator capable of delaying, stopping, flagging, or otherwise identifying an access request that is in violation of the access control policy. Although not explicitly shown, operation 312 can include taking remedial action to mitigate the impermissible access request such as, for example, automatically deleting the access request, delaying the access request, denying the access request, issuing a notification to a user interface communicatively coupled to the access control chip 112, or another remedial action.

Figure 4:
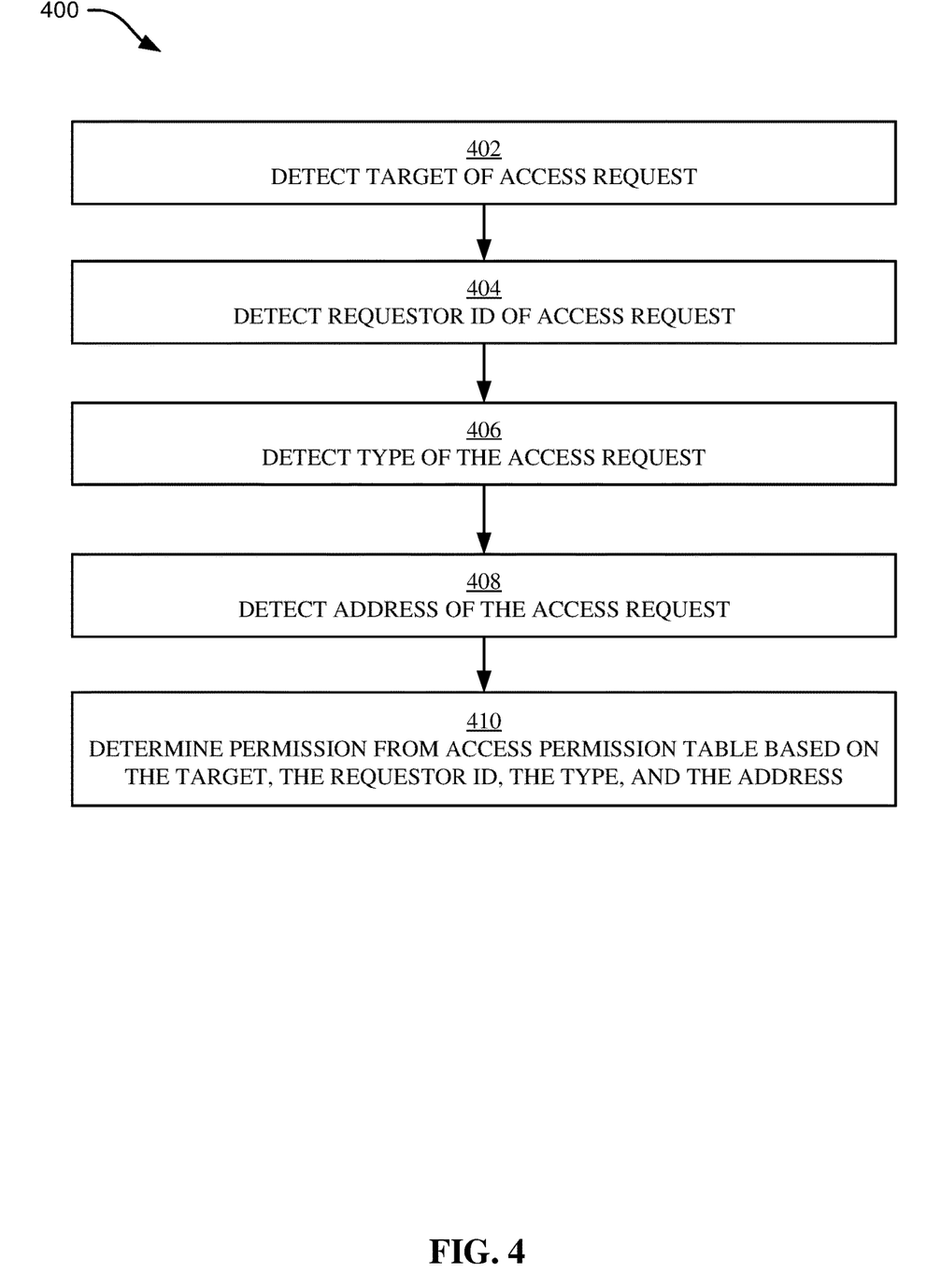
FIG. 4 illustrates a flowchart of an example method for determining if a request is a violation of an access permissions table, in accordance with some embodiments of the present disclosure.

FIG. 4 illustrates a flowchart of an example method 400 for determining if an access request is a violation of an access permissions table 110-2, in accordance with some embodiments of the present disclosure. The method 400 can be implemented by a computer, a processor, one or more components of the illustrated in FIGS. 1A and/or 1B such as, but not limited to, the BMC 104, the access control chip 112, and/or another component or set of components. In some embodiments, the method 400 is a sub-method of operation 310 of FIG. 3.

Operation 402 includes detecting a target of the access request (e.g., by parsing the access request). The target can be one of the peripherals 114 connected to the BMC 104. For example, the target can be a sensor (e.g., thermal sensor, humidity sensor, speed sensor, etc.), a fan, a flash device, a light emitting diode (LED), a Peripheral Component Interconnect (PCI) link, an Ethernet link, or another target.

Operation 404 includes detecting a requestor ID of the access request. The requestor ID of the access request can be an originator of the access request such as, for example, the host 102, the BMC 104, or another component of the first example server environment 100A or the second example server environment 100B.

Operation 406 includes detecting a type of the access request. The type of the access request can be a read request, a write request, or another type of access request. Operation 408 includes detecting an address of the access request. In some embodiments, the address can be a null or not applicable value if the address is the same as the target detected in operation 402 (e.g., for a sensor). Operation 410 includes retrieving the permission from the access permission table 110-2 for the given target, requestor ID, type, and address of the access request.

Figure 5:
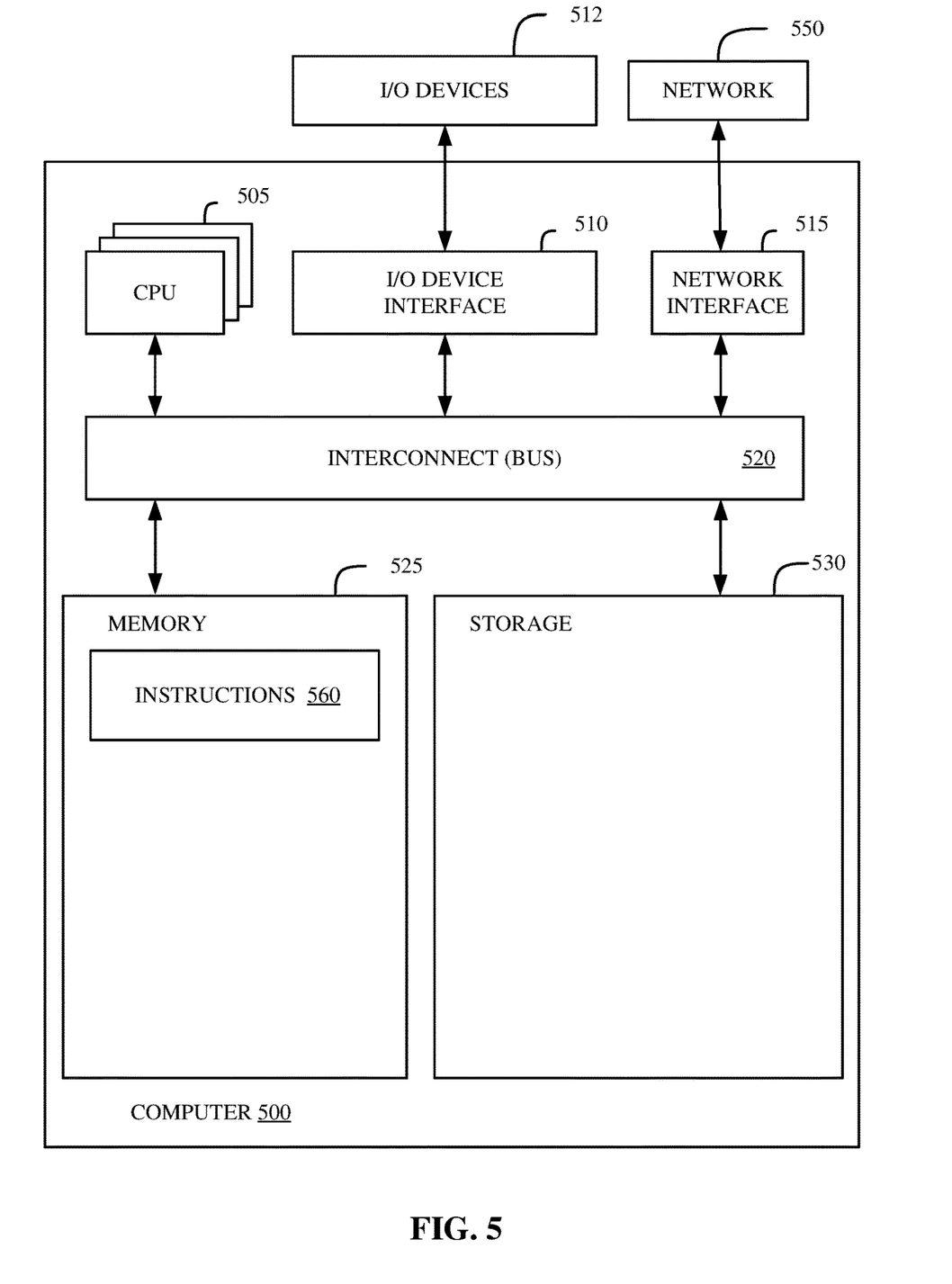
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the method described in FIGS. 3-4 and/or implement the functionality discussed in FIGS. 1A, 1B, and/or 2. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine such that the client machine executes the method, or a portion of the method, based on the instructions provided by computer 500. In some embodiments, the computer 500 is incorporated into (or functionality similar to computer 500 is virtually provisioned to) one or more entities illustrated in FIGS. 1A and/or 1B (e.g., host 102, BMC 104, access control chip 112, etc.) and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the method of FIGS. 3-4 and/or implementing the functionality discussed in any portion of FIGS. 1A, 1B, and/or 2. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the method described with respect to FIGS. 3-4 and/or implement any portion of the functionality discussed in FIGS. 1A, 1B, and/or 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a baseboard management controller (BMC). The baseboard management controller (BMC) includes a BMC flash storage storing firmware and an access permission table, wherein the access permission table defines an access control policy for access requests to peripherals communicatively coupled to the BMC; and an access control chip comprising one or more processors and a write-once memory, wherein the write-once memory stores a copy of the access permission table, and wherein the access control chip is configured to manage access to the peripherals using the access permission table.

Example 2 includes the baseboard management controller (BMC) of example 1, including or excluding optional features. In this example, the access permission table defines a permission for respective combinations of target, requestor identifier (ID), access type, and address range.

Example 3 includes the baseboard management controller (BMC) of any one of examples 1 to 2, including or excluding optional features. In this example, the firmware is configured to validate an integrity of the access permission table during boot-up of the BMC, and, in response to validating the integrity of the access permission table, write the access permission table to the write-once memory.

Example 4 includes the baseboard management controller (BMC) of any one of examples 1 to 3, including or excluding optional features. In this example, the access permission table is stored in the BMC flash as part of a firmware update of the BMC.

Example 5 includes the baseboard management controller (BMC) of any one of examples 1 to 4, including or excluding optional features. In this example, the access control chip is configured to mitigate malicious access requests to the peripherals from a server communicatively coupled to the BMC.

Example 6 includes the baseboard management controller (BMC) of any one of examples 1 to 5, including or excluding optional features. In this example, the peripherals are selected from a group consisting of: sensors, fans, and light emitting diodes (LEDs).

Example 7 includes the baseboard management controller (BMC) of any one of examples 1 to 6, including or excluding optional features. In this example, the peripherals comprise communication links selected from a group consisting of: Peripheral Component Interconnect (PCI) links, and Ethernet links.

Example 8 includes the baseboard management controller (BMC) of any one of examples 1 to 7, including or excluding optional features. In this example, the peripherals comprise flash storage devices.

Example 9 is a system. The system includes a server; a baseboard management controller (BMC), wherein the BMC is communicatively coupled to the server and comprises a BMC flash storage storing firmware and an access permission table; a plurality of peripherals communicatively coupled to the BMC; and an access control chip communicatively coupled to the BMC, wherein the access control chip comprises one or more processors and a write-once memory, wherein the write-once memory is configured to store a copy of the access permission table, wherein the access permission table defines an access control policy for access requests to the plurality of peripherals, and wherein the access control chip is configured to manage access to the plurality of peripherals using the access permission table.

Example 10 includes the system of example 9, including or excluding optional features. In this example, the access permission table defines a permission for respective combinations of target, requestor identifier (ID), access type, and address range.

Example 11 includes the system of any one of examples 9 to 10, including or excluding optional features. In this example, the firmware is configured to validate an integrity of the access permission table during boot-up of the BMC, and, in response to validating the integrity of the access permission table, write the access permission table to the write-once memory.

Example 12 includes the system of any one of examples 9 to 11, including or excluding optional features. In this example, the access permission table is stored in the BMC flash as part of a firmware update of the BMC.

Example 13 includes the system of any one of examples 9 to 12, including or excluding optional features. In this example, the access control chip is configured to mitigate malicious access requests to the peripherals from the server.

Example 14 is a computer-implemented method. The method includes storing an access permission table in a flash storage of a baseboard management controller (BMC), wherein the access permission table defines an access control policy for access requests to peripherals communicatively coupled to the BMC; performing a secure boot cycle of the BMC; copying the access permission table from the flash storage of the BMC to a write-once memory of an access control chip communicatively coupled to the BMC; detecting an access request a peripheral communicatively coupled to the BMC; and determining whether the access request is allowed based on the access permission table stored in the write-once memory.

Example 15 includes the method of example 14, including or excluding optional features. In this example, the access permission table is stored in the flash storage of the BMC as part of a firmware update of the BMC.

Example 16 includes the method of any one of examples 14 to 15, including or excluding optional features. In this example, performing the secure boot cycle of the BMC further comprises verifying an integrity of the access permission table.

Example 17 includes the method of any one of examples 14 to 16, including or excluding optional features. In this example, the access permission table defines a permission for respective combinations of target, requestor identifier (ID), access type, and address range.

Example 18 includes the method of any one of examples 14 to 17, including or excluding optional features. In this example, the access control chip is configured to mitigate malicious access requests to the peripherals from a server communicatively coupled to the BMC.

Example 19 includes the method of any one of examples 14 to 18, including or excluding optional features. In this example, the method includes determining that the access request is allowed based on the access permission table; and allowing the access request.

Example 20 includes the method of any one of examples 14 to 19, including or excluding optional features. In this example, the method includes determining that the access request is not allowed based on the access permission table; and issuing a machine check exception (MCE).

Example 21 is a system. The system includes one or more processors and one or more computer-readable storage media storing program instructions which, when executed by the one or more processors, are configured to cause the one or more processors to perform a method according to any one of examples 14 to 20.

Example 22 is a computer program product. The computer program product includes one or more computer readable storage media, and program instructions collectively stored on the one or more computer readable storage media, the program instructions comprising instructions configured to cause one or more processors to perform a method according to any one of examples 14 to 20.

What is claimed is:

1. A baseboard management controller (BMC) comprising:
    a BMC flash storage storing firmware and an access permission table, wherein the access permission table defines an access control policy for access requests to peripherals communicatively coupled to the BMC; and
    an access control chip comprising one or more processors and a write-once memory, wherein the write-once memory stores a copy of the access permission table, and wherein the access control chip is configured to manage access to the peripherals using the access permission table.

2. The BMC of claim 1, wherein the access permission table defines a permission for respective combinations of target, requestor identifier (ID), access type, and address range.

3. The BMC of claim 1, wherein the firmware is configured to validate an integrity of the access permission table during boot-up of the BMC, and, in response to validating the integrity of the access permission table, write the access permission table to the write-once memory.

4. The BMC of claim 1, wherein the access permission table is stored in the BMC flash as part of a firmware update of the BMC.

5. The BMC of claim 1, wherein the access control chip is configured to mitigate malicious access requests to the peripherals from a server communicatively coupled to the BMC.

6. The BMC of claim 1, wherein the peripherals are selected from a group consisting of: sensors, fans, and light emitting diodes (LEDs).

7. The BMC of claim 1, wherein the peripherals comprise communication links selected from a group consisting of: Peripheral Component Interconnect (PCI) links, and Ethernet links.

8. The BMC of claim 1, wherein the peripherals comprise flash storage devices.

9. A system comprising:
    a server;
    a baseboard management controller (BMC), wherein the BMC is communicatively coupled to the server and comprises a BMC flash storage storing firmware and an access permission table;
    a plurality of peripherals communicatively coupled to the BMC; and
    an access control chip communicatively coupled to the BMC, wherein the access control chip comprises one or more processors and a write-once memory, wherein the write-once memory is configured to store a copy of the access permission table, wherein the access permission table defines an access control policy for access requests to the plurality of peripherals, and wherein the access control chip is configured to manage access to the plurality of peripherals using the access permission table.

10. The system of claim 9, wherein the access permission table defines a permission for respective combinations of target, requestor identifier (ID), access type, and address range.

11. The system of claim 9, wherein the firmware is configured to validate an integrity of the access permission table during boot-up of the BMC, and, in response to validating the integrity of the access permission table, write the access permission table to the write-once memory.

12. The system of claim 9, wherein the access permission table is stored in the BMC flash as part of a firmware update of the BMC.

13. The system of claim 9, wherein the access control chip is configured to mitigate malicious access requests to the peripherals from the server.

14. A computer-implemented method comprising:
    storing an access permission table in a flash storage of a baseboard management controller (BMC), wherein the access permission table defines an access control policy for access requests to peripherals communicatively coupled to the BMC;
    performing a secure boot cycle of the BMC;

copying the access permission table from the flash storage of the BMC to a write-once memory of an access control chip communicatively coupled to the BMC;

detecting an access request for a peripheral communicatively coupled to the BMC; and determining whether the access request is allowed based on the access permission table stored in the write-once memory.

15. The method of claim 14, wherein the access permission table is stored in the flash storage of the BMC as part of a firmware update of the BMC.

16. The method of claim 14, wherein performing the secure boot cycle of the BMC further comprises verifying an integrity of the access permission table.

17. The method of claim 14, wherein the access permission table defines a permission for respective combinations of target, requestor identifier (ID), access type, and address range.

18. The method of claim 14, wherein the access control chip is configured to mitigate malicious access requests to the peripherals from a server communicatively coupled to the BMC.

19. The method of claim 14, further comprising:
determining that the access request is allowed based on the access permission table; and
allowing the access request.

20. The method of claim 14, further comprising:
determining that the access request is not allowed based on the access permission table; and
issuing a machine check exception (MCE).

* * * * *